US008696947B2

(12) United States Patent
Ollmann et al.

(10) Patent No.: US 8,696,947 B2
(45) Date of Patent: Apr. 15, 2014

(54) NANOWIRE RECOVERY METHODS, COMPOSITIONS, AND ARTICLES

(75) Inventors: Richard R. Ollmann, Woodbury, MN (US); Chaofeng Zou, Maplewood, MN (US); Gary E. Labelle, Stillwater, MN (US); Doreen C. Lynch, Afton, MN (US)

(73) Assignee: Carestream Health, Inc., Rochester, NY (US)

( * ) Notice: Subject to any disclaimer, the term of this patent is extended or adjusted under 35 U.S.C. 154(b) by 167 days.

(21) Appl. No.: 13/307,043

(22) Filed: Nov. 30, 2011

(65) Prior Publication Data
US 2012/0168690 A1 Jul. 5, 2012

Related U.S. Application Data

(60) Provisional application No. 61/429,590, filed on Jan. 4, 2011.

(51) Int. Cl.
*B82B 3/00* (2006.01)
(52) U.S. Cl.
USPC ............ 252/514; 210/787; 210/767; 977/762
(58) Field of Classification Search
USPC ............... 252/514; 977/762; 210/787, 767
See application file for complete search history.

(56) References Cited

U.S. PATENT DOCUMENTS

| 6,788,453 | B2 * | 9/2004 | Banin et al. | 359/342 |
|---|---|---|---|---|
| 7,074,980 | B2 * | 7/2006 | Prato et al. | 585/839 |
| 2007/0259994 | A1 * | 11/2007 | Tour et al. | 523/333 |
| 2011/0045272 | A1 * | 2/2011 | Allemand | 428/292.1 |

FOREIGN PATENT DOCUMENTS

| CN | 200410070765 | 7/2004 |
|---|---|---|
| JP | 2009-129732 | 6/2009 |
| JP | 2010-255037 | 11/2010 |
| WO | WO 2006/109059 | 10/2006 |

OTHER PUBLICATIONS

"Sodium Sulfate Anhydrous". Chemicalland21. http://www.chemicalland21.com/industrialchem/inorganic/SODIUM%SULPHATE.htm Accessed on Jun. 27, 2013.*
*Angew. Chem. Int. Ed.* 2009, 48, 60, 44 pages, Y. Xia, Y. Xiong, B. Lim, S. E. Skrabalak.
*Chemical Engineers' Handbook*, 5th ed., R.H. Perry and C.H. Chilton, eds., McGraw-Hill, 1973, pp. 19-57 to 19-98.
Liangbing Hu, Han Sun Kim, Jung-Yong Lee, Peter Peumans and Yi Cui, "Scalable Coating and Properties of Transparent Flexible, Silver Nanowire Electrodes", *ACS Nano*, 2010, 4 (5), pp. 2955-2963, (available at www.stanford.edu/group/cui_group/papers/Transprent%20Ag.pdf.
Anuj Madaria, Akshay Kumar, Fumiaki Ishikawa, and Chongwu Zhou, "Uniform Highly Conductive, and Patterned Transparent Films of a Percolating Silver Nanowire Network on Rigid and Flexible Substrates Using a Dry Transfer Technique," *Nano Res.*, 2010, 3, pp. 564-573.

(Continued)

*Primary Examiner* — Ling Choi
*Assistant Examiner* — David L Miller
(74) *Attorney, Agent, or Firm* — Reed L. Christiansen

(57) ABSTRACT

Methods of recovering compositions comprising nanowires and the product compositions are disclosed and claimed. The product compositions produced by these methods are able to provide equivalent performance to virgin raw materials in transparent conductive film manufacturing processes.

11 Claims, 1 Drawing Sheet

(56) References Cited

OTHER PUBLICATIONS

Xiao-Yan Zeng, Qi-Kai Zhang, Rong-Min Yu and Can-Zhong Lu, "A New Transparent Conductor: Silver Nanowire Film Buried at the Surface of a Transparent Polymer," *Adv. Mater.*, 2010, 22, pp. 4484-4488.

Sun Y et al, "Large-Scale Synthesis of Uniform Silver Nanowires Through a Soft, Self-Seeding, Polyol Process", Jun. 5, 2002, pp. 833-837, XP009063485.

International Search Report, International Application No. PCT/US2011/062751, May 14, 2012, pp. 2.

\* cited by examiner

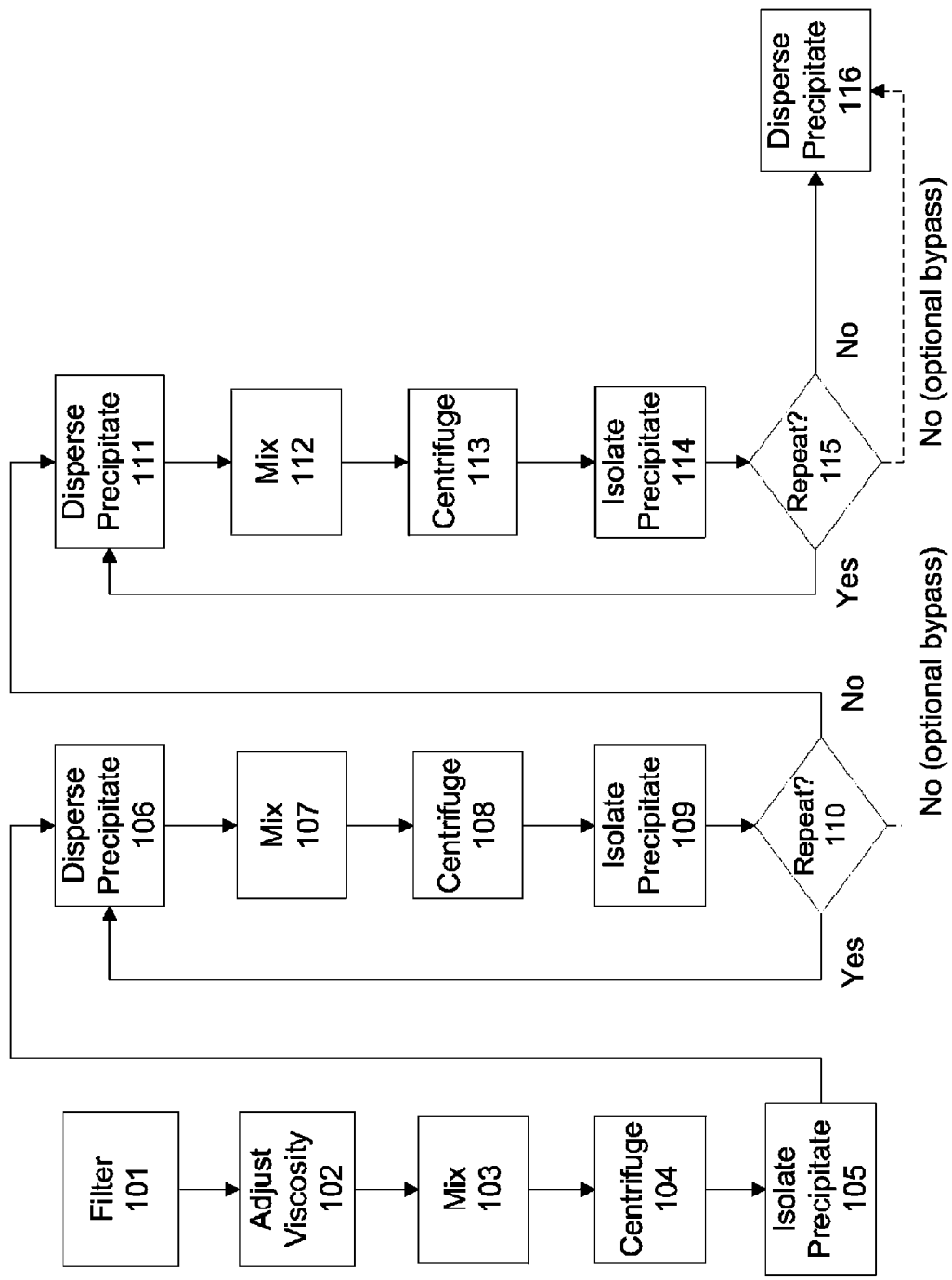

NANOWIRE RECOVERY METHODS, COMPOSITIONS, AND ARTICLES

CROSS REFERENCE TO RELATED APPLICATIONS

This application claims the benefit of U.S. Provisional Application No. 61/429,590, filed Jan. 4, 2011, entitled "NANOWIRE RECOVERY METHODS, COMPOSITIONS, AND ARTICLES," which is hereby incorporated by reference in its entirety.

BACKGROUND

The general preparation of silver nanowires (10-200 aspect ratio) is known. See, for example, Angew. Chem. Int. Ed. 2009, 48, 60, Y. Xia, Y. Xiong, B. Lim, S. E. Skrabalak, which is hereby incorporated by reference in its entirety. Filtration and centrifugation technologies are known. See, for example, Chemical Engineers' Handbook, 5th ed., R. H. Perry and C. H. Chilton, eds., McGraw-Hill, 1973, pp. 19-57 to 19-98, which is hereby incorporated by reference in its entirety. Methods of fabricating devices with transparent layers comprising silver nanowires are described in, for example, Liangbing Hu, Han Sun Kim, Jung-Yong Lee, Peter Peumans and Yi Cui, "Scalable Coating and Properties of Transparent Flexible, Silver Nanowire Electrodes", ACS Nano, 2010, 4 (5), 2955-2963, (available at www.stanford.edu/group/cui_group/papers/Transprent %20Ag.pdf), and Anuj Madaria, Akshay Kumar, Fumiaki Ishikawa, and Chongwu Zhou, "Uniform Highly Conductive, and Patterned Transparent Films of a Percolating Silver Nanowire Network on Rigid and Flexible Substrates Using a Dry Transfer Technique," Nano Res., 2010, 3, 564-573, and Xiao-Yan Zeng, Qi-Kai Zhang, Rong-Min Yu and Can-Zhong Lu, "A New Transparent Conductor: Silver Nanowire Film Buried at the Surface of a Transparent Polymer," Adv. Mater., 2010, 22, 4484-4488, all of which are incorporated by reference in their entirety.

SUMMARY

At least one embodiment provides a method comprising separating a slurry comprising macroscopic solids and nanowires into at least one first composition comprising at least some of the macroscopic solids and at least one second composition comprising at least some of the nanowires, and separating the at least one second composition into at least one third composition and at least one product composition, the at least one third composition comprising at least one contaminant and said at least one product composition comprising at least some of the nanowires. At least some of the macroscopic solids may have a smallest dimensional size greater than about 1 micron. In some embodiments, all of the macroscopic solids have a largest dimensional size greater than 1 micron. At least some of the nanowires may have a largest dimensional size less than about 200 nanometers. In some embodiments, all of the nanowires have a largest dimensional size less than about 200 nanometers. In at least some embodiments, at least some of the nanowires are silver. The at least one contaminant may be hydrophilic or hydrophobic or both. In at least some embodiments, the at least one product composition comprises at least about 87% of the nanowires in the slurry.

In at least some embodiments, separating the slurry comprises filtering the slurry. Such filtration may be performed continuously, semi-continuously, or batch-wise.

In at least some embodiments, separating the at least one second composition comprises centrifugation. Such filtration may be performed continuously, semi-continuously, or batch-wise. Such centrifugation may, in some cases, be carried out in the presence of at least one first solvent. For example, such a first solvent may solubilize the at least one contaminant. Such a first solvent may, for example, comprise at least one alcohol or at least one ketone, or both. In some cases, the centrifugation may also be carried out in the presence of at least one second solvent. For example, such a second solvent may not be soluble with the at least one contaminant or the at least one first solvent or both.

Other embodiments provide the product composition produced by such methods. In some cases, such product compositions may comprise at least one alcohol.

These embodiments and other variations and modifications may be better understood from the brief description of figures, description, exemplary embodiments, examples, figures, and claims that follow. Any embodiments provided are given only by way of illustrative example. Other desirable objectives and advantages inherently achieved may occur or become apparent to those skilled in the art.

BRIEF DESCRIPTION OF FIGURES

FIG. 1 illustrates one possible embodiment of a nanowire recovery process.

DESCRIPTION

Silver nanowires (AgNWs) are a component of several newly developed nanowire-based electronic components, such as, for example, transparent conductive films (TCFs), conductive inks, thin film transistors (TFT) and electromagnetic (EM) shielding. Silver nanowires are difficult and costly to produce. Recovery of AgNWs is one means of making production of electronic devices using them more economical. Applicants have developed methods to recover AgNWs from used and leftover coating and printing mixtures.

FIG. 1 illustrates one example of such a method. A first step (101) comprises separation of a slurry comprising nanowires and macroscopic solids into at least one first composition comprising at least some of the macroscopic solids and at least one second composition comprising at least some of the nanowires. Such a separation may, for example, be carried out by filtration, where the at least one second composition is a filtrate. In some cases, however, the amount of macroscopic solids may be small enough to allow dispensing with this step.

A second step (102) comprises adjustment of the viscosity of the at least one second composition of step 101. Such an adjustment of viscosity may, for example, be carried out by mixing the at least one second composition with one or more solvents, such as, for example water, alcohols, such as isopropanol or ethanol, ketones, such as acetone or methyl ethyl ketone, and the like. Suitable target viscosities may be selected to increase the ease with which the nanowires may be separated via, for example, centrifugation.

A third step (103) comprises contacting the mixture of step 102 with one or more solvents capable of dissolving impurities in, on, and/or around the nanowires. Suitable solvents may, for example be chosen to have Hansen solubility parameters similar to those of the impurities to be removed. The mixture may, in some cases, be agitated or shaken to promote contacting of the one or more solvents with the impurities.

A fourth step (104) comprises separating the mixture of step 103 to separate at least one solids-rich portion comprising the nanowires from one or more liquid phases. Such a separation may, for example, be carried out via centrifugation, where a precipitate comprising the silver nanowires is separated from the one or more liquid phases comprising the impurities.

In some embodiments, the at least one solids-rich portion of the separation of step 104 may then be isolated in a fifth step (105). In other embodiments, no such isolation is required; rather, the next solvent used to disperse the solids may be used to displace some or all of the portion of the one or more liquid phases that may still remain with the solids-rich portion.

In some cases, the precipitate of steps 104-105 may be dispersed in one or more final solvents in a step (116). Such a final solvent may, for example, be one that is used in a downstream processing step for manufacturing compositions, layers, or articles comprising the recovered nanowires. Alcohols, such as, for example, isopropanol, are exemplary final solvents.

In other cases, the precipitate of steps 104-105 may be dispersed in one or more solvents, either the same as those used in step 103, or, in some cases, supplemented or replaced by other solvents. Such solvents may be chosen to have Hansen solubility parameters similar to other impurities to be removed. In such cases, the precipitate may be dispersed in such solvents and mixed in steps 106-107, separated by, for example, centrifugation, in step 108, and optionally isolated in step 109. Steps 106-109 may be repeated, if desired, as indicated in step 110, using either the same solvents, or, in some cases, supplemented or replaced by other solvents.

In some cases, the precipitate of steps 108-109 may be dispersed in one or more final solvents in a step (116). Such a final solvent may, for example, be one that is used in a downstream processing step for manufacturing compositions, layers, or articles comprising the recovered nanowires. Alcohols, such as, for example, isopropanol, are exemplary final solvents.

In other cases, the precipitate of steps 108-109 may be dispersed in one or more compatibilizing solvents that may enable displacement of the one or more purifying solvents and may enhance the dispersion of the nanowires in a final solvent. For example, such compatibilizing solvents may comprise mixtures of acetone and isopropanol. Such a procedure is illustrated in FIG. 1 in steps 111-114. Steps 111-114 may be repeated, if desired, as indicated in step 115. After no, one, or more repetitions, the precipitate of steps 113-114 may be dispersed in one or more final solvents in step 116. Such a final solvent may, for example, be one that is used in a downstream processing step for manufacturing compositions, layers, or articles comprising the recovered nanowires. Alcohols, such as, for example, isopropanol, are exemplary final solvents.

More generally, at least some embodiments provide methods comprising separating a slurry comprising macroscopic solids and nanowires into at least one first composition comprising at least some of the macroscopic solids and at least one second composition comprising at least some of the nanowires, and separating the at least one second composition into at least one third composition and at least one product composition, the at least one third composition comprising at least one contaminant and said at least one product composition comprising at least some of the nanowires. At least some of the macroscopic solids may have a smallest dimensional size greater than about 1 micron. In some embodiments, all of the macroscopic solids have a largest dimensional size greater than 1 micron. At least some of the nanowires may have a largest dimensional size less than about 200 nanometers. In some embodiments, all of the nanowires have a largest dimensional size less than about 200 nanometers. In at least some embodiments, at least some of the nanowires are silver. The at least one contaminant may be hydrophilic or hydrophobic or both. In at least some embodiments, the at least one product composition comprises at least about 87% of the nanowires in the slurry.

In at least some embodiments, separating the slurry comprises filtering the slurry. Such filtration may be performed continuously, semi-continuously, or batch-wise.

In at least some embodiments, separating the at least one second composition comprises centrifugation, such as, for example, centrifuging at least one fourth composition comprising the at least one second composition and at least one first solvent. The at least one contaminant may be soluble or not soluble in the at least one first solvent, or the at least one contaminant may comprise the at least one first solvent. In some cases, the centrifugation may be performed continuously, semi-continuously, or batch-wise. In at least some embodiments, the centrifugation may comprise multi-stage centrifugation, which may, for example, be performed in one centrifuge or in at least two centrifuges, at least some of which may operate in series or parallel or both.

In at least some embodiments, separating the at least one second composition comprises centrifugation in the presence of at least one first solvent and at least one second solvent, where the at least one contaminant is soluble in the at least one first solvent and insoluble in the at least one second solvent. In some cases, the at least one first contaminant comprises the at least one first solvent. The at least one first solvent and the at least one second solvent may be miscible or immiscible. In some cases, separating the second composition may comprise mixing the second composition with the at least one first solvent or the at least one second solvent or both. Where the centrifugation comprises multi-stage centrifugation, the at least one first solvent and the at least one second solvent may both be present in at least one stage, or they may not be both be present in at least one stage, or both; the at least one first solvent and the at least one second solvent may be fed to different stages, or to the same stage, or both; and the product composition may comprise the precipitate from the final stage.

Other embodiments provide the product composition produced by such methods and articles comprising such product compositions. At least some such articles comprise at least one transparent conductive film possessing a haze value below about 4.5% and a transmittance of at least about 87%. Examples of such articles may include electronic components and devices.

EXEMPLARY EMBODIMENTS

U.S. Provisional Application No. 61/429,590, filed Jan. 4, 2011, entitled "NANOWIRE RECOVERY METHODS, COMPOSITIONS, AND ARTICLES," which is hereby incorporated by reference in its entirety, disclosed the following 37 non-limiting exemplary embodiments:

A. A method comprising:

separating a slurry comprising nanowires and macroscopic solids into at least one first composition comprising at least some of the macroscopic solids and at least one second composition comprising at least some of the nanowires;

separating the at least one second composition into at least one third composition and at least one product composition, said at least one third composition comprising at least one contaminant and said at least one product composition comprising at least some of the nanowires.

B. The method according to embodiment A, wherein separating the slurry comprises filtering the slurry.

C. The method according to embodiment A, wherein separating the at least one second composition comprises centrifugation.

D. The method according to embodiment C, wherein separating the at least one second composition comprises centrifuging at least one fourth composition comprising the at least one second composition and at least one first solvent.

E. The method according to embodiment D, wherein the at least one contaminant is soluble in the at least one first solvent.

F. The method according to embodiment D, wherein the at least one contaminant is not soluble in the at least one first solvent.

G. The method according to embodiment D, wherein the at least one contaminant comprises the at least one first solvent.

H. The method according to embodiment C, wherein the centrifugation is performed continuously.

J. The method according to embodiment C, wherein the centrifugation is performed semi-continuously.

K. The method according to embodiment C, wherein the centrifugation is performed batch-wise.

L. The method according to embodiment C, wherein the centrifugation comprises multi-stage centrifugation.

M. The method according to embodiment L, wherein the multi-stage centrifugation is performed in one centrifuge.

N. The method according to embodiment L, wherein the multi-stage centrifugation is performed in at least two centrifuges.

P. The method according to embodiment N, wherein at least some of the centrifuges operate in series.

Q. The method according to embodiment N, wherein at least some of the centrifuges operate in parallel.

R. The method according to embodiment A, wherein separating the at least one second composition comprises centrifugation in the presence of at least one first solvent and at least one second solvent, said at least one contaminant being soluble in the at least one first solvent and said at least one contaminant being insoluble in the at least one second solvent.

S. The method according to embodiment R, wherein the at least one contaminant comprises the at least one first solvent.

T. The method according to embodiment R, wherein the at least one first solvent and the at least one second solvent are miscible.

U. The method according to embodiment R, wherein the at least one first solvent and the at least one second solvent are immiscible.

V. The method according to embodiment R, wherein separating the second composition comprises mixing the second composition with the at least one first solvent.

W. The method according to embodiment R, wherein separating the second composition comprises mixing the second composition with the at least one second solvent.

X. The method according to embodiment R, wherein the centrifugation comprises multi-stage centrifugation.

Y. The method according to embodiment X, wherein the at least one first solvent and the at least one second solvent are both present in at least one stage.

Z. The method according to embodiment X, wherein the at least one first solvent and the at least one second solvent are not both present in at least one stage.

AA. The method according to embodiment X, wherein the at least one first solvent is fed to at least one stage and the at least one second solvent is fed to at least one other stage different from the at least one stage.

AB. The method according to embodiment X, wherein the at least one first solvent and the at least one second solvent are fed to a same stage.

AC. The method according to embodiment X, wherein the product composition comprises the precipitate from the final stage.

AD. The method according to embodiment A, wherein the at least one third composition further comprises at least one solvent that solubilizes the at least one contaminant.

AE. The method according to embodiment A, wherein at least some of the macroscopic solids have a largest dimensional size greater than about 1 micron.

AF. The method according to embodiment A, wherein at least some of the nanowires have a largest dimensional size less than about 200 nanometers.

AG. The method according to embodiment A, wherein at least some of the nanowires are silver.

AH. The method according to embodiment A, wherein the at least one contaminant is hydrophilic.

AJ. The method according to embodiment A, wherein the at least one contaminant is hydrophobic.

AK. The method according to embodiment A, wherein the at least one product composition comprises at least about 87% of the nanowires.

AL. The product composition produced by the method according to embodiment A.

AM. An article comprising the product composition according to embodiment AL.

AN. The article according to embodiment AM, said article comprising at least one transparent conductive film possessing a haze value below about 4.5% and a transmittance of at least about 87%.

EXAMPLE 200 g of recovered transparent conductive film coating solution was shaken for 10 min with 200 g of acetone. The suspension was then centrifuged for 45 min at 400 G. The supernatant was discarded and the precipitate was suspended in 200 g of a 1:1 wt:wt mixture of acetone and isopropanol (IPA). This was shaken for 10 min, and then centrifuged for 45 min at 400 G. The supernatant was discarded and the precipitate was taken up in 150 g of IPA. This was shaken for 10 min, and then centrifuged for 45 min at 400 G. The supernatant was discarded and the precipitate was taken up in 90 g IPA, which analyzed to 3.95% solids using a Mettler LP16 infrared heater, indicating 87% recovery of the silver in the original mixture.

The recovered precipitate was used in making a transparent coating. Table I compares transmittance and haze of this coating and a coating made from virgin silver nanowires (Blue Nano, N.C.). Transmittance and haze were measured using a BYK Gardner Hazegard instrument, according to ASTM method D-1003.

The invention has been described in detail with reference to particular embodiments, but it will be understood that variations and modifications can be effected within the spirit and scope of the invention. The presently disclosed embodiments are therefore considered in all respects to be illustrative and not restrictive. The scope of the invention is indicated by the appended enumerated embodiments, and all changes that come within the meaning and range of equivalents thereof are intended to be embraced therein.

TABLE I

| Nanowire Dispersion Source | Resistivity (ohm/sq) | Percent Transmittance | Percent Haze |
|---|---|---|---|
| Virgin Nanowires | 120-200 | 88.1 | 4.50 |
| Recycled Nanowires | 120-180 | 87.7 | 4.48 |

What is claimed:

1. A method comprising:

separating a slurry comprising macroscopic solids and silver nanowires into at least one first composition comprising at least some of the macroscopic solids and at least one second composition comprising at least a first portion of the silver nanowires, the macroscopic solids having a largest dimensional size greater than 1 micron; and separating the at least one second composition into at least one third composition and at least one product composition, the at least one third composition comprising at least one contaminant and the at least one product composition comprising at least a second portion of the silver nanowires, wherein separating the at least one second composition comprises centrifuging the at least one second composition in the presence of at least one first solvent comprising at least one first alcohol and at least one ketone.

2. The method according to claim 1, wherein separating the slurry comprises filtration.

3. The method according to claim 1, wherein the at least one contaminant is soluble in the at least one first solvent.

4. The method according to claim 3, wherein the centrifugation is performed in the presence of at least one second solvent.

5. The method according to claim 4, wherein at least one of the at least one contaminant or the at least one first solvent is insoluble in the at least one second solvent.

6. The method according to claim 1, wherein at least some of the silver nanowires have a largest dimensional size less than about 200 nm.

7. The method according to claim 1, wherein the at least one product composition comprises at least about 87% of the silver nanowires.

8. The method according to claim 1, wherein the at least one product composition comprises at least one second alcohol.

9. The product composition produced according to the method of claim 1.

10. The method according to claim 8, wherein the at least one first alcohol and the at least one second alcohol are the same.

11. The method according to claim 8, wherein the at least one first alcohol and the at least one second alcohol are not the same.

* * * * *